United States Patent [19]

Federighi

[11] Patent Number: 4,768,429
[45] Date of Patent: Sep. 6, 1988

[54] FOOD PROCESSOR ATTACHMENT AND APPARATUS FOR PEELING GARLIC OR THE LIKE

[76] Inventor: George J. Federighi, 370 - 13th Street, San Francisco, Calif. 94103

[21] Appl. No.: 40,067

[22] Filed: Apr. 20, 1987

[51] Int. Cl.$^4$ .............................................. A23N 7/00
[52] U.S. Cl. ........................................ 99/631; 99/623; 241/199.12; 241/282.1
[58] Field of Search ................... 99/584, 623, 629–634; 366/314; 241/199.12, 282.1

[56] References Cited

U.S. PATENT DOCUMENTS

| | | | |
|---|---|---|---|
| 1,923,806 | 8/1933 | Anstiss | 99/633 |
| 2,246,054 | 6/1941 | Marty | 241/282.1 X |
| 2,838,083 | 6/1958 | Fox et al. | 99/633 |
| 3,762,308 | 10/1973 | Greene et al. | 99/632 |
| 4,143,824 | 3/1979 | Shiotani | 366/314 X |
| 4,410,280 | 10/1983 | Yamauchi et al. | 366/314 |

*Primary Examiner*—Timothy F. Simone
*Attorney, Agent, or Firm*—Harris Zimmerman; Howard Cohen

[57] ABSTRACT

A rotary attachment is disposed within the bowl of a food processing appliance in engagement with the drive shaft of the appliance and has a horizontal rotating disk with an abrasive upper surface which quickly removes the dry and brittle outer covering of garlic cloves or similar food ingredients. The apparauts speeds and simplifies peeling operations and minimizes problems with the volatile substances that may be released during peeling of such food ingredients.

3 Claims, 1 Drawing Sheet

U.S. Patent  Sep. 6, 1988  4,768,429
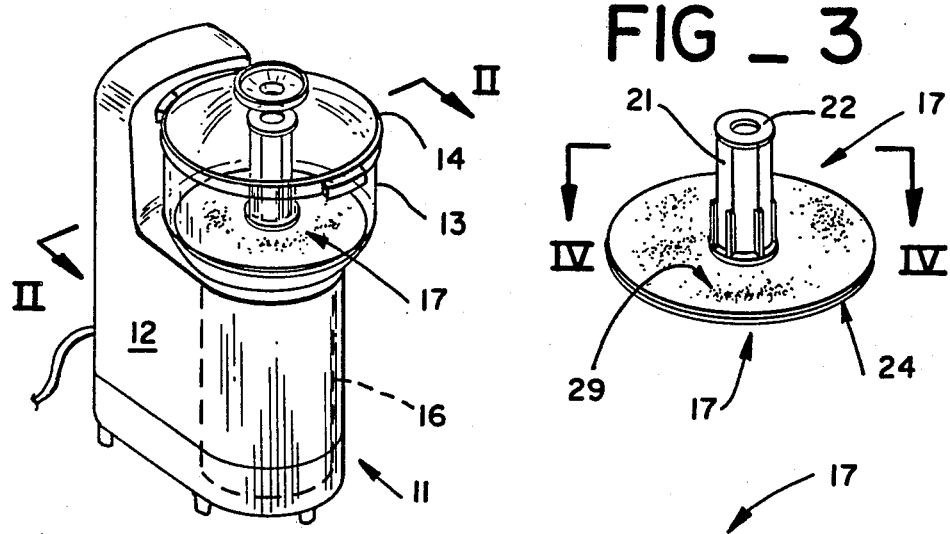
FIG _ 3
FIG _ 1
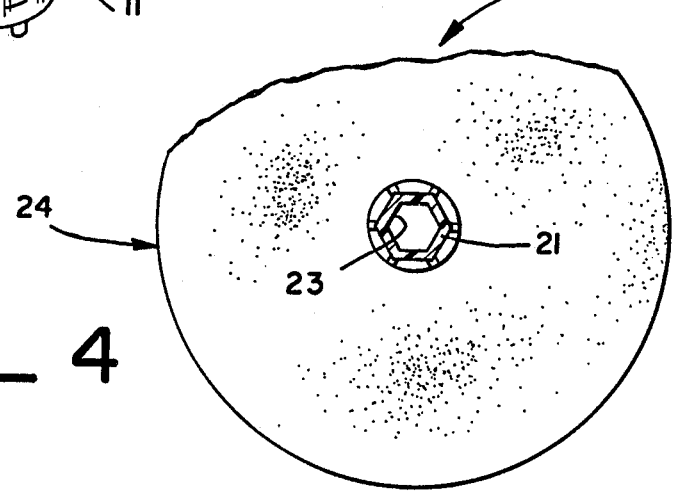
FIG _ 4
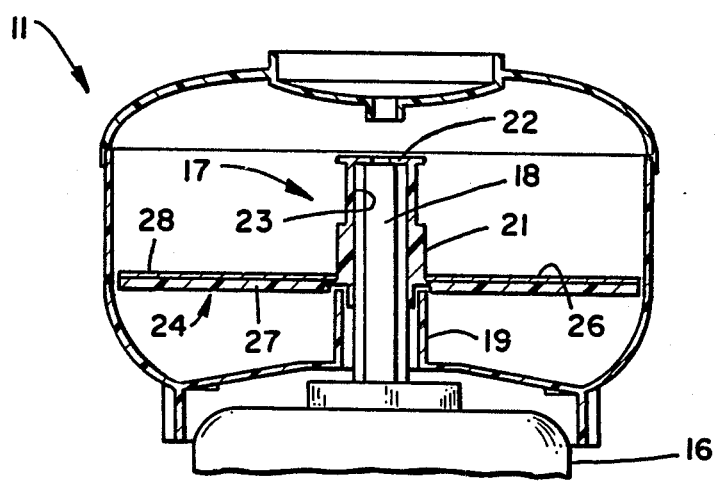
FIG _ 2

FOOD PROCESSOR ATTACHMENT AND APPARATUS FOR PEELING GARLIC OR THE LIKE

TECHNICAL FIELD

This invention relates to food processing equipment and more particularly to a food processor and food processor accessory for facilitating the peeling of foodstuffs which have a dry husk or outer covering.

BACKGROUND OF THE INVENTION

Food processing appliances having a food product receptacle and a drive shaft extending into the receptacle for rotating any of a variety of interchangable food cutting attachments have greatly facilitated the preparation of meals both in commercial establishments and in the home. Such appliances enable subdividing of food materials into any of a variety of configurations an/or mixing of materials with a degree of speed and precision that cannot be realized with knives or other manual tools.

Food processors have not heretofore been particularly suited for peeling certain food products which are characterized by a dry and sometimes brittle husk or other covering. Garlic and some types of dried onion are examples of such food products which generally require peeling before being added into the other constituents of a recipe.

Garlic or the like has heretofore typically been peeled manually with the aid of a knife or similar instrument. The process is undesirably tedious and time consuming and requires continuous careful attention on the part of the food preparer. The odor of garlic tends to remain on the hands and clothing of the food preparer. Volatile substances rereleased during the peeling of onions can also be irritating to the eyes.

Preparation of meals which include foods of the above described kinds could be accomplished more rapidly and with much less difficulty if the peeling operations could be accomplished with the aid of a food processor appliance.

The present invention is directed to overcoming one or more of the problems discussed above.

SUMMARY OF THE INVENTION

In one aspect, the present invention provides a peeling attachment for a food processor which has a receptacle for food products and an upwardly directed rotary drive shaft with which a food working attachment in the receptacle can be engaged. The attachment includes a hub shaped for engagement with the drive shaft with the hub being positioned in coaxial relationship with the shaft and has means for constraining the hub to rotate with the drive shaft. A disk is secured to the hub in coaxial relationship with the hub and has an abrasive surface which faces upward when the attachment is engaged with the drive shaft.

In another aspect of the invention, a peeling attachment for a food processor includes a laminated disk having an upper lamination of material which has an abrasive surface and having a relatively thick lower lamination to which the upper lamination is secured. A tubular hub extends through the center of the disk and is coaxial with the disk and is integral with the lower lamination of the disk. The hub has an axial passage of non-circular cross sectional configuration which is shaped for receiving the drive output shaft of the food processor.

In still another aspect, the invention provides a food processor having a receptacle for holding edible articles which are to be processed and having a drive output shaft which extends upward into the receptacle for engaging and rotating a food working attachment within the receptacle. The food working attachment is a peeling attachment having a disk disposed in coaxial relationship with the drive output shaft and which is engaged with the shaft for rotation thereby. The upper surface of the disk has a coating of abrasive grit.

The invention provides a rotating abrasive surface within the food receptacle of a food processor which quickly abrades away the dried and somewhat brittle outer covering of garlic cloves or similar food items. Peeling is accomplished quickly, easily and without the risks involved in manual peeling with a knife. The food preparer is also less exposed to the adverse effects of volatile aromatic components which can be released during the peeling of uncooked garlic or onions.

BRIEF DESCRIPTION OF THE DRAWINGS

FIG. 1 is a perspective view of a food processor appliance embodying the invention.

FIG. 2 is a cross section view of the upper portion of the apparatus of FIG. 1 taken along line II—II therof.

FIG. 3 is a perspective view of a food processor attachment for peeling garlic or the like shown removed from the food processor.

FIG. 4 is an elevation section view of the attachment of FIG. 3 taken along line III—III thereof.

DETAILED DESCRIPTION OF THE PREFERRED EMBODIMENT

Referring initially to FIG. 1 of the drawings, food processor 11 appliances of the type to which the invention is applicable may take a variety of forms and in this particular example is of the form having an upright body 12 supporting a cylindrical food receptacle 13. The receptacle 13 and a removable cover 14 of the receptacle are preferably formed of transparent material to facilitate observation of the progress of food processing operations. An electrical motor 16 within body 12 drives the food processor 11.

Suitable detailed constructions for the above described components of the food processor 11 are known to the art. The present food processor 11 differs from the prior constructions in that the food working component within receptacle 13 is a peeling attachment 17. The peeling attachment 17 of this embodiment is removable from the food processor 11 to enable other operations to be performed with other attachments although the peeling attachment may be a permanent component in instances where the processor is to be used exclusively for peeling operations.

Referring now to FIG. 2, the drive output shaft 18 from motor 16 is aligned in a vertical direction and is centered with respect to the food receptacle 13. The drive shaft 18, which has a hexagonal cross sectional configuration in this type of food processor 11, extends upward into receptacle 13 through a cylindrical sleeve 19 at the base of the receptacle. Shaft 18 extends above the upper end of sleeve 19 to a substantially higher level within receptacle 13.

Referring jointly to FIGS. 2 and 3, the peeling attachment 17 has a tubular hub 21 proportioned to be fitted onto the upper portion of drive shaft 18. An annular lip 22 at the upper end of hub 21 seats against the top of drive shaft 18 to hold the hub at an intermediate elevation within the space enclosed by the receptacle 13 and cover 14. At that location, the lower end of the hub 21 extends a short distance into the upper end of sleeve 19. This prevents entry of peelings into the sleeve.

Referring now to FIGS. 2 and 4 in conjunction, the axial passage 23 within hub 21 has a hexagonal cross section conforming to that of the food processor drive shaft 18. Thus the hub 18 is rotated by shaft 18 when motor 16 is actuated.

Referring again to FIGS. 2 and 3, the peeling attachment 17 has a disk 24 portion which is coaxial with the hub 21 and which may be integrally formed with the hub. Disk 24 has a diameter conforming to the inside diameter of receptacle 13 and connects with hub 21 near the lower end of the hub at a level immediately above the top of sleeve 19.

Disk 24 has an abrasive upper surface 26 which abrades or grinds away the dry brittle outer covering of garlic cloves or the like that rest on the disk when the apparatus is in operation. While the disk 24 can be formed of metal having minute sharp projections on the upper surface, the present embodiment has an advantageous laminated construction with the lower lamination 27 being hard plastic integral with the plastic material of hub 21. The upper lamination 28 is abrasive sheet material such as sandpaper which is secured to the lower lamination 27 with adhesive. The sandpaper is preferably of a grade having moderately coarse grit 29 on the surface 26.

In operation, cover 14 of the food processor 11 is temporarily removed and the garlic cloves or the like which are to be peeled are deposited on top of disk 24. The cover 14 is then replaced and motor 16 is actuated. Rotation of the abrasive surface 26 then abrades away the outer covering of those portions of the garlic cloves or the like that are in contact with the surface. Rotation of the disk 24 also agitates and turns the cloves or the like causing all outer portions of the cloves to contact the disk and be peeled within a short period of time. The food processor 11 is then shut down to minimize abrasion of the inner portions of the cloves which are to be used as a food ingredient. The transparency of the receptacle 13 facilitates monitoring of the peeling operations to enable prompt deactuation of the motor 16 when the process has been completed. Cover 14 may then be removed to recover the garlic cloves or the like and the peelings may be removed by lifting the attachment 17 from drive shaft 18. The peeling operation proceeds very quickly and without the difficulties and problems encountered in manual peeling of such food items.

While the invention has been described with respect to a single preferred embodiment, many modifications in the construction are possible and it is not intended to limit the invention except as defined in the following claims.

1. A peeling attachment for a food processor which has a receptacle for food products and a rotary drive shaft which extends up into said receptacle to support and rotate any selected one of a variety of food working attachments that may be engaged on said drive shaft,
    said peeling attachment being comprised of a hollow hub which is fittable on the upper end of said drive shaft in coaxial relationship therewith, means for constraining said hub to rotate with said drive shaft, and a circular disk extending outward from a lower region of said hub in coaxial relationship therewith, said disk having an abrasive upper surface, said surface having a configuration wherein all points on said surface that are equidistant from the center of said surface are co-planar.

2. The peeling attachment of claim 1 wherein said disk has a laminated construction including a lower lamination which is integral with said hub and a thinner upper lamination of sheet material adhered to said lower lamination, said sheet material having a coating of abrasive grit on the upper surface thereof.

3. A peeling attachment for a food processor comprising a laminated disk having an upper lamination of material which has an abrasive surface and having a relatively thick lower lamination to which said upper lamination is secured, said upper lamination having a configuration wherein all points on said abrasive surface that are equidistant from the center thereof are co-planar, and a tubular hub extending through said disk at the center thereof and being coaxial therewith and being integral with said lower lamination of said disk, said hub having an axial passage of non-circular cross sectional configuration which is shaped for receiving the drive output shaft of said food processor.

* * * * *